(12) United States Patent
Weitkamp et al.

(10) Patent No.: US 6,783,326 B2
(45) Date of Patent: Aug. 31, 2004

(54) MEANS FOR ADJUSTING THE ROTOR BLADE OF A WIND POWER PLANT ROTOR

(75) Inventors: Roland Weitkamp, Belm (DE); Henning Lütze, Bad Bentheim (DE); André Riesberg, Wallenhorst (DE); Jochen Anemüller, Elze (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/224,828

(22) Filed: Aug. 20, 2002

(65) Prior Publication Data

US 2003/0116970 A1 Jun. 26, 2003

(30) Foreign Application Priority Data

Aug. 20, 2001 (DE) .......................... 101 40 793

(51) Int. Cl.⁷ ................................. F01D 7/00
(52) U.S. Cl. ................. 416/1; 416/31; 416/155
(58) Field of Search .................. 416/155, 156, 416/157 A, 157 B, 158, 31, 1

(56) References Cited

U.S. PATENT DOCUMENTS 4,348,155 A * 9/1982 Barnes et al. ............ 416/46

4,490,093 A 12/1984 Chertok et al.

FOREIGN PATENT DOCUMENTS

| DE | 196 34 059 C1 | 10/1997 |
|---|---|---|
| DE | 197 20 025 A1 | 10/1997 |
| DE | 196 44 705 A1 | 4/1998 |
| DE | 297 22 109 U1 | 5/1998 |
| DE | 200 17 994 U1 | 3/2001 |
| DE | 101 16 011 A1 | 5/2002 |

* cited by examiner

Primary Examiner—Edward K. Look
Assistant Examiner—Kimya N. McCoy
(74) Attorney, Agent, or Firm—Blakely, Sokoloff, Taylor & Zafman LLP

(57) ABSTRACT

Two independent adjusting systems are recommended for each rotor blade (6) for blade angle adjustments of the rotor blades (6) of the rotor of a wind power plant, assuring full redundancy of the blade angle adjustment. By suitable control of the individual adjustment paths of the two adjustments systems, additional advantageous effects can be gained, such as good lubricant distribution and/or even load distribution over time (FIG. 1).

23 Claims, 6 Drawing Sheets

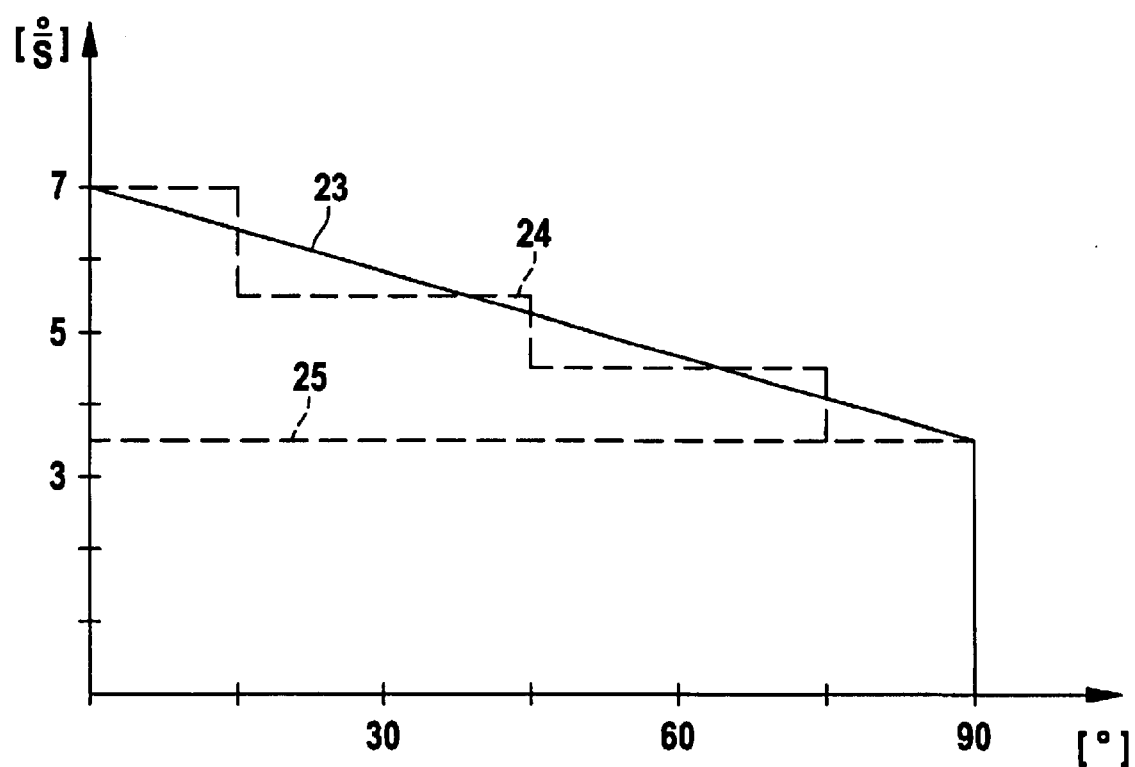

MEANS FOR ADJUSTING THE ROTOR BLADE OF A WIND POWER PLANT ROTOR

Figure 1:
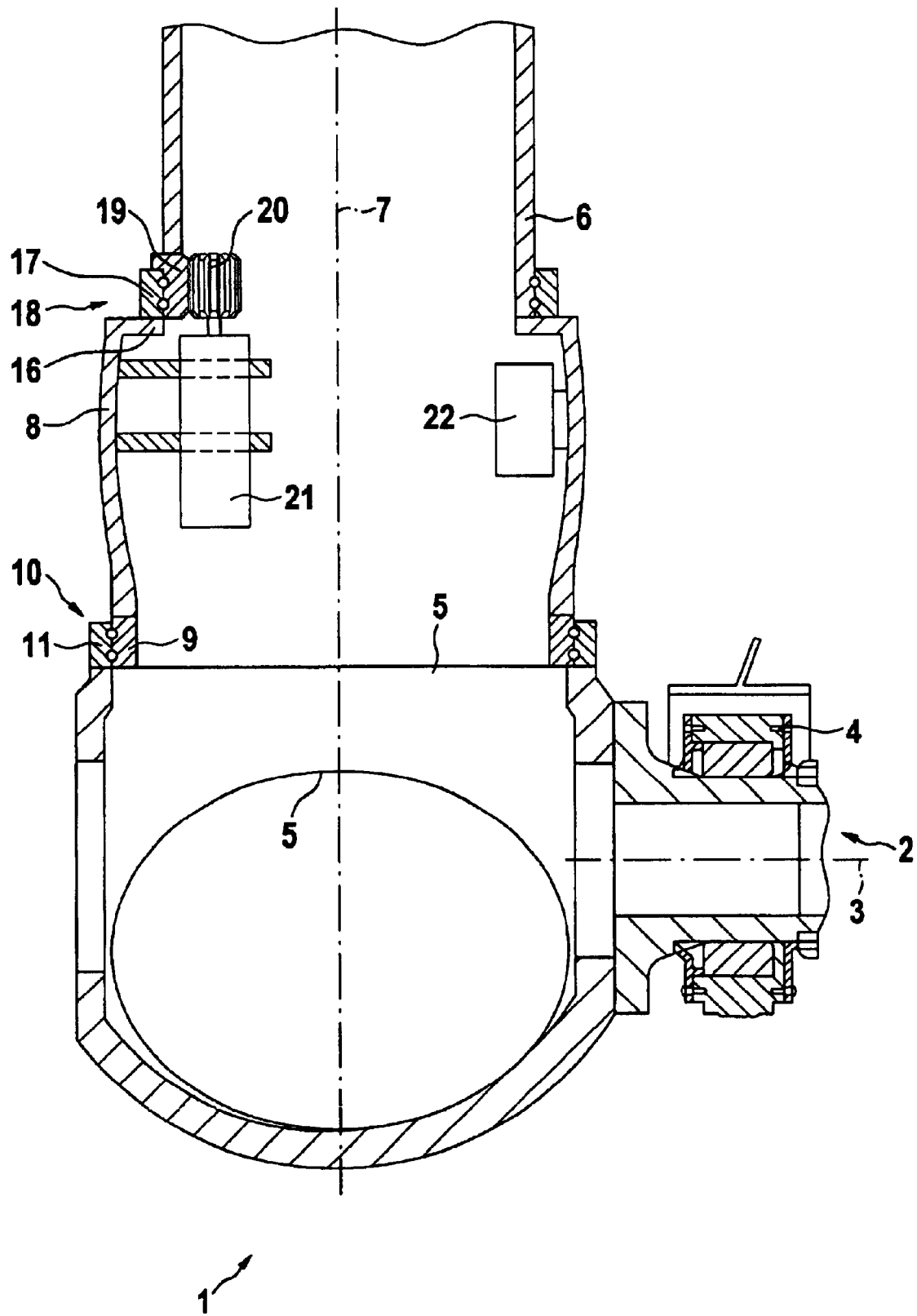

The invention relates to a means for adjusting a rotor blade, the long axis of which extends out from the hub of a wind power plant rotor, about an azimuthal adjusting angle in relation to the long axis, and to a process for operating this means.

Controlling or regulating the azimuthal angle setting of the rotor blades of wind power plant rotors makes it possible to reduce the angle of incidence at high wind speeds. Thus the rotor speed and the power from the generator driven by the rotor can be limited, preventing overloading of the mechanical and electrical components of the wind power plant. Corresponding systems operated electrically or hydraulically have been known for many years. Those include systems with adjusting drives in the rotor hub or in a [LP] tubular section with a nonrotating connection to the rotor blade. Systems which are integrated directly into the rotor blade are also known (DE-A 196 34 059).

There are also partially redundant systems in which, for example, a collective hydraulic central adjusting means is combined with three individual hydraulic adjusting means installed in the rotor hub which individually cover only part of the adjustment range required at low-load operation. There are also occasional designs of fully redundant drive systems for rotor blade adjustment. Those, however, have no redundancy for the case of blocking of the rotating connection between the rotor blade and the rotor hub.

For example, if one of the rotor blades fails during a disconnection from the network or an emergency shutdown of the adjusting system, that rotor blade remains in its operating position, while the other rotor blades are adjusted into their braking positions. The resulting aerodynamic imbalance, especially for large rotors 100 m or more in size, leads to such high stresses that they represent the case of extreme load which must be taken into consideration in designing many major components of the turbine.

The invention is based on the objective of providing a means of the sort initially stated which assures reliability by complete redundancy while still allowing design savings on the entire wind power plant to make up for the added cost needed.

This objective is attained according to the invention by a means comprising two independent adjusting systems, each of which adjusts the rotor blade even if each of the other adjusting systems fails.

In the means according to the invention, the azimuthal adjusting movement of the rotor blade is made up of the adjusting movements of both the adjusting systems. As the two are independent of each other, if one of the two adjusting systems fails, the other one will still do the adjusting. The cost of this complete redundancy is more than compensated by a distinct reduction of the extreme loads which must be considered in dimensioning.

It is understood that one means according to the invention is provided for each rotor blade of the rotor. For examples, rotors with two or three rotor blades have, correspondingly, two or three means according to the invention. The drive energy for the adjusting system can be hydraulic, electrical, or mechanical in a known manner. The mechanical energy can, for example, utilize the rotational energy of the rotor. Energy storage can be provided independently for each means. Alternatively, a single energy store can be utilized jointly for all the rotor blades of a rotor. In any case, the drive energy can also be obtained from internal or external forces operating on each rotor blade, such as air, mass, inertial or centrifugal forces.

One suitable embodiment of the means has each of the two adjusting systems placed between the rotor hub and the rotor blade, with a rotatable coupling which can be adjusted by the drive. That can, for instance, be accomplished by adding the additional adjusting system to the adjusting system normally placed at the rotor hub. Alternatively, though, both adjusting systems can be placed outside the rotor hub, at a distance from it, along the longitudinal axis of the rotor blade. All the common [see Translator's note 1] drive systems, such as electrical drives, hydraulic cylinders, screw spindles, and the like, are covered by the drive concept in this description and the claims.

It may be advantageous to place the two rotatable connections so that they are essentially concentric with each other. In this case, they have the same radial position with respect to the rotor axis. Then the flanges of the rotor blade and the rotor hub which connect to the rotatable connections can be made with clearly different diameters. Under certain conditions, such as limitations due to transport logistics, that can make an advantageous contribution to the economic optimization of the wind power plant.

With respect to a simple modular design, it is advantageous to place the two rotatable connections separated axially from each other along the long axis of the rotor blade, and particularly to place one of the two rotatable connections and its drive at the rotor hub and the other rotatable connection and its drive outside the rotor hub. In this case, the adjusting system at the rotor hub and the other, as a separate unit, are axially separated from each connecting flange of the rotor hub.

The structure is particularly simple if the rotatable connection outside the rotor hub and its drive are placed on a tubular part extending axially between the two rotatable connections. Then the tubular part can also be used to hold the drive energy store for the adjusting system. At the same time, the tubular part can be used to adapt the rotor diameter to different sites with the same rotor blade. The tubular parts of different lengths (extenders) needed for that can preferably be made of fibrous composite materials such as glass fiber reinforced or carbon fiber reinforced plastic. A winding process is preferably suited for that.

Another suitable embodiment has one of the two rotatable connections and its drive at the rotor hub and the other rotatable connection and its drive connected directly to the rotor blade. That is particularly suitable for high-wind sites at which a small rotor diameter is advantageous. The intermediate segment (extender) formed by the tubular part is omitted in this case. The drive for the rotatable connection on the rotor blade and other components connected with it can be placed either inside or outside the rotor blade.

It is specifically provided, as part of the invention, that the two adjusting systems can be actuated simultaneously. In that way, the adjusting speeds needed in a safety shutdown can be achieved with a particularly economical design of the means because the adjustment speeds are the sums of those for the individual adjusting systems. For example, consider a wind power plant having a three-blade rotor and in which the necessary adjusting speed is to be 7°/second. Thus this wind power plant has three adjusting means, each with two independent adjusting systems, for a total of six adjusting systems. As an example, three of them can be operated at a maximum adjusting rate of 3°/second with the other three at 4°/second. If the wind power plant is robustly dimensioned, it is adequate to equip the three adjusting systems with the lower adjustment rate with just one common drive and/or energy storage system (collective adjusting system), while the adjusting systems with the higher rates are designed completely independent of each other. In all, then, there are four completely independent adjusting systems. If a single adjusting system fails, then two rotor blades are driven at 7°/second and one at 3°/second. But if the collective system fails, then all three rotor blades are driven at 4°/second. Both types of failure produce substantially lower loads than is the case for the state of the technology, where blocking of one rotatable connection results in two rotor blades being adjusted at 7°/second while the third rotor blade does not move at all. For highly optimized wind power plants, however, it will be reasonable to make all the adjusting systems (six adjusting systems in the case of a rotor with three rotor blades) completely independent, so that the full adjusting rate is available at two rotor blades for any individual failure.

In another advantageous embodiment, the azimuthal adjustment rate resulting from the operation of the two adjusting systems is variably controllable. To reduce the load on the tower of a large wind turbine in a safety shutdown by a negative tower thrust (reverse thrust), it has proven very advantageous, when the safety chain is initiated, to adjust the rotor blades to their safe feathered position, not at a constant rate of adjustment but with an adjustment rate which can be varied during the adjustment process. Depending on the plant concept, depending, for instance, on the number of rotor blades, the rotor speed, and the compliance of the rotor blades and of the tower, it may be best to control the adjustment rate as a function of the time, of the rotor blade angle, or of the distance of adjustment.

Of course, the technical problem arises that the safety adjustment function in wind power plants should be accomplished only with the simplest electromechanical components to make sure that the system remains fully functional even after a lightning strike. That can be done in a particularly simple and fail-safe manner within the invention by controlling the adjustment rate of one adjusting system as a function of the adjustment distance of the other adjusting system.

For example, it is very simple in this manner to make the effective adjustment rate decrease linearly from an initial maximum value at a rotor blade angle of 0° to a lower value, half of the initial maximum value, at a rotor blade angle of 90°, a trapezoidal curve for the adjustment rate. If one of the two adjusting systems fails in this process, the other adjusting system provides adjustment to a safe feathered position at half the maximum adjustment rate. In case of a failure, only the triangular portion of the trapezoidal adjustment rate curve is cut off. In this manner, the effect of failure of one adjustment system is reduced so much, especially in a wind power plant having a rotor with three blades, each having two independent adjustment systems, that the added loads, particularly those due to aerodynamic imbalance and delayed braking, can be carried by the supporting structure without problems.

It is advantageous to design the means according to the invention such that at least one of the adjusting systems is electrical. It can, as is known at the state of the technology, have an electric gear motor combination in which the output gear meshes with gearing on one ring of the rotatable connection. In particular, very similar designs can be used for both adjusting systems of each rotor blade. That gives a very economical solution because of the mass production effect.

Electrical adjustment systems can advantageously be further designed to provide a monitoring means which at least temporarily increases the adjustment rate of the other adjustment system in case of failure of one of the systems. Electromechanical switches and logical relay switches can be considered a monitoring means. If failure of one adjustment system is detected, the other adjustment system of the pair can be operated briefly at overload, with higher than the nominal adjustment rate, further reducing the effect of a failure. As the adjustment processes involve durations of not more than 30 seconds, such an overload response of the adjusting systems involved is possible without thermal damage.

Furthermore, the electrical adjustment systems can be designed so that the adjustment rate can be changed by stepwise switching batteries feeding the drive on and off. This on and off switching can be done, for example, by electromechanical switches actuated by cams on the other adjustment system. In this case, of course, the switches must be relatively large, as they must switch direct current under load.

That can be avoided by another design in which the adjustment rate is changed by stepwise switching of a stator winding of the drive. For example, the trapezoidal adjustment rate curve can be approximated with three steps in a two-pole stator winding.

According to a further concept of the invention, the drive of one adjustment system has a series-wound motor and the drive of the other adjustment system has a shunt-wound motor. That takes into consideration the situation that the highest possible starting torque is desired for blade adjustment systems, even in battery operation, so that the drive is not stalled by peak wind loads. That corresponds to the behavior of a series-wound machine. On the other hand, the adjustment rate should remain as nearly constant as possible at low loads. That corresponds to the behavior of a parallel-wound machine. The loading of the wind power plant usually decreases relatively rapidly after the adjustment process begins. For that reason, it is particularly advantageous to equip the two adjustment systems operating on the same rotor blade with these two different types of drive motors. It is particularly advantageous to control the series-wound motor in the manner shown above, preferably stepwise, during the adjustment process. The invention also considers providing continuous ramp-shaped control either additionally or alternatively.

It can be particularly advantageous economically for the drive of one adjustment system to have a three-phase motor and the drive of the other adjustment system to have a direct-current motor. The three-phase motor requires use of a frequency converter to accomplish the variable adjustment speed for the control operation. Then for a safety shutdown, a battery is switched to the DC intermediate circuit. That is known at the state of the technology. Depending on the redundancy required, a single inverter can be provided for all the rotor blades, or an inverter for each rotor blade. Such a combined means, in which one three-phase system and one direct-current system can operate on each rotor blade, combines the economic advantage of the three-phase system with the high reliability of the direct-current system.

A further concept of the invention provides that the axes of rotation of the two rotatable connections are at an angle with each other. That can take into consideration the situation that in large wind power plants the bending of the rotor blades under load becomes critical, and it is necessary to counteract the danger of a collision between the rotor blades and the tower due to that. A common help is that of using rotor blades which have, in their unloaded state, pre-curvature directed away from the tower. However, there are structural limits to such pre-curvature. Alternatively, it is possible to give the rotor blades a "cone angle". That is, the rotor blades are angled out of the radial plane of the rotor axis away from the tower. Usual cone angles are between 0.5° and 6°, although substantially larger cone angles can be used in principle. Here, though, there is a major disadvantage that rotor blades set up at a cone angle are stressed during their entire lifetime by additional centrifugal forces and by additional bending moments due to their weight. These act variably during a revolution of the rotor. Furthermore, the projected rotor area decreases as the cone angle increases. That, for example, leads to a power loss of 0.5% at a cone angle of 4°. However, there is a risk of the rotor blades colliding with the tower only at wind speeds in the vicinity of the nominal wind speed and/or at high wind turbulence.

The mutual angle of the axes of rotation of the two rotatable connections makes it possible to adjust the cone angle of the rotor blade concerned by simultaneous counter-adjustment of the two rotatable connections, without necessarily altering the azimuthal adjustment angle of the rotor blade. Thus the cone angle can be controlled, depending on the prevailing wind conditions, particularly the wind speed and turbulence, such that the energy yield is maximized, the loads on the rotor blades are minimal, and collision of the rotor blades with the tower is still reliably prevented. It is practical to incorporate an integrated cone angle controller in the control system for the wind power plant. For variable-speed wind power plants with the cone angle in the wind direction (downwind coning) in particular, it is possible to compensate, at least partially, for the centrifugal forces of the wind loads caused by the cone angle. That is fundamentally true for wind power plants with rotors on the upwind side as well as on the downwind side.

One embodiment that is particularly favorable with respect to production cost provides that the two rotatable connections are formed by a single live ring roller bearing with three rings and two bearing housings. The rotor hub, bearing rings, rotor blade and adjustment drives can be arranged in many different ways and varied systematically according to the laws of design methodology.

The invention also provides a process for operating the means according to the invention such that the two rotatable connections can be driven with respect to each other to adjust a specified adjustment angle so as to favor distribution of the grease in the rotatable connections. This takes into account the situation that during most of the life of the wind power plant the live ring roller bearing is set into only one or two position ranges, the optimal blade angle and the park position. That makes lubricant supply a problem, because good distribution of the lubricant is best assured by frequent operation with large adjustment paths. This lubrication problem is solved at the state of the technology by the fact that the rotor blades can be adjusted for short times in wind conditions which do not require adjustment of the rotor blades. That, of course, results in decreases in the yield. Now, with the two rotatable connections provided according to the invention, it is possible to move the bearing housings of the rotatable connections of the two adjustment systems with respect to each other without necessarily moving the azimuthal adjustment of the rotor blade in a particularly advantageous manner. This can assure optimal lubricant supply. Alternatively, it is possible to make adjustments temporarily at regular intervals or continuously at very low adjustment rates.

Another suitable potential operation is that of driving the two rotatable connections with respect to each other, adjusting a specified adjustment angle in a manner favoring equal azimuthal load distribution over time. This manner of operation considers the fact that the structural load-bearing parts in the transition region between the rotor blade and the rotor hub, such as the extenders, rotatable connections, and bolt flanges are very unevenly loaded around their periphery because random loads due to rotor thrust are predominantly in one direction, while the periodic weight loads dominate in another direction perpendicular to that. As for the lubrication problem for the rotatable connections, the counteracting adjustment of the rotatable connections equalizes the loads on these parts, allowing a more economical design of the highly loaded bearing structure in the region of the rotor blade roots.

The invention, in all its embodiments, is applicable for all horizontal wind power plants, independently of the number of rotor blades. Its is more economical the smaller the number of blades on the rotor is.

Figure 1A:
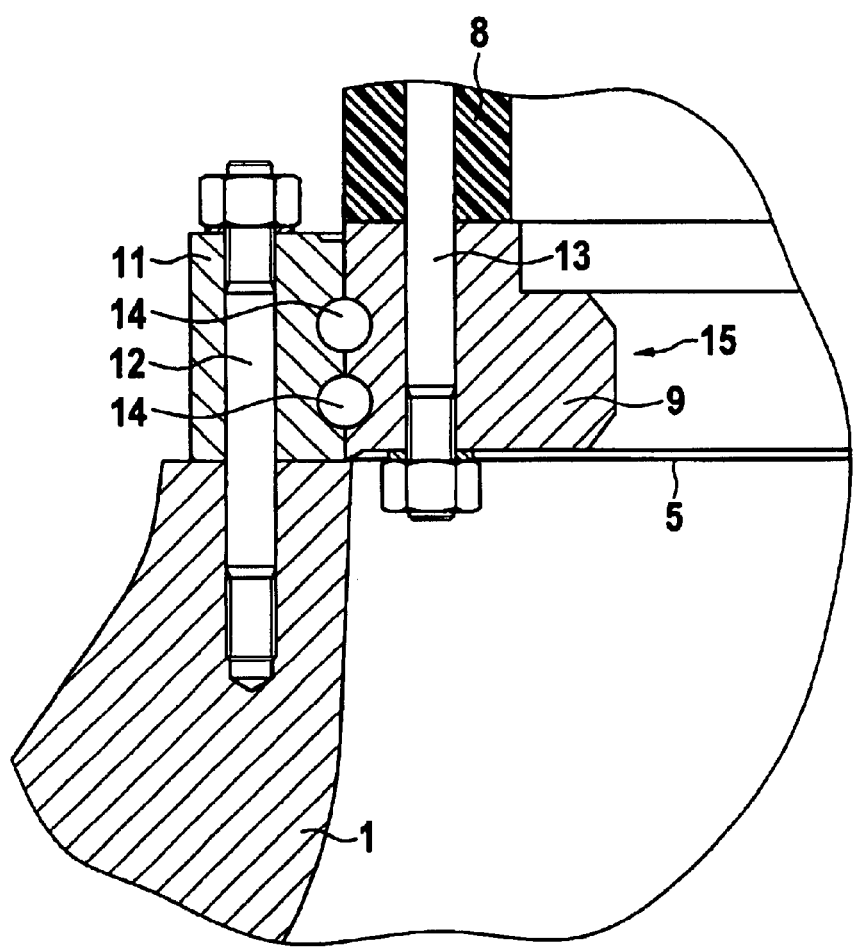

The invention is further explained in the following, with reference to the drawing strictly as an example. The figures show:

FIG. 1 A schematic representation in a section through the rotor axis and the longitudinal axis of the rotor blade in the vicinity of the rotor hub FIG. 1a a detailed representation of the rotatable connection at the rotor hub in FIG. 1

Figure 3:
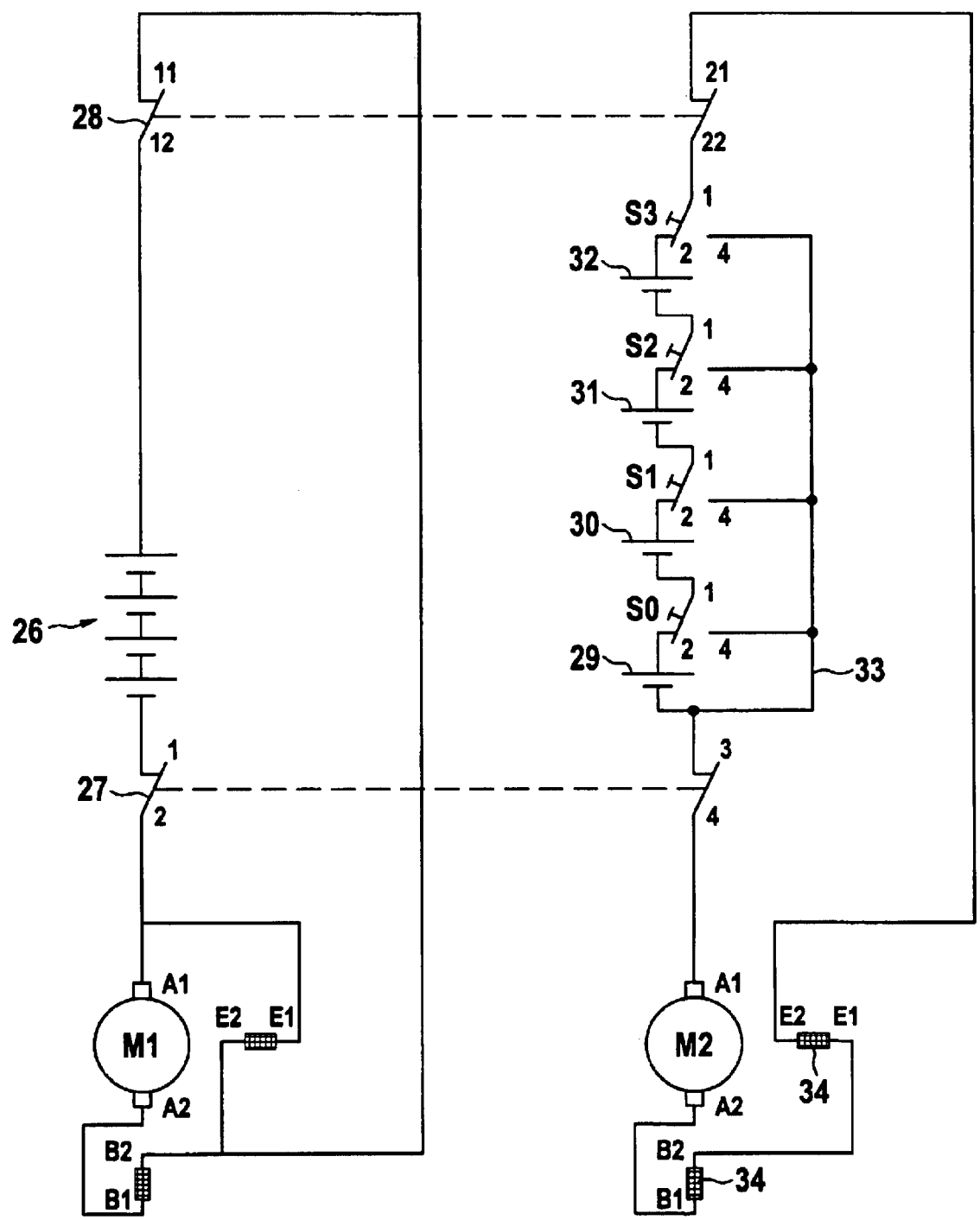
Figure 4:
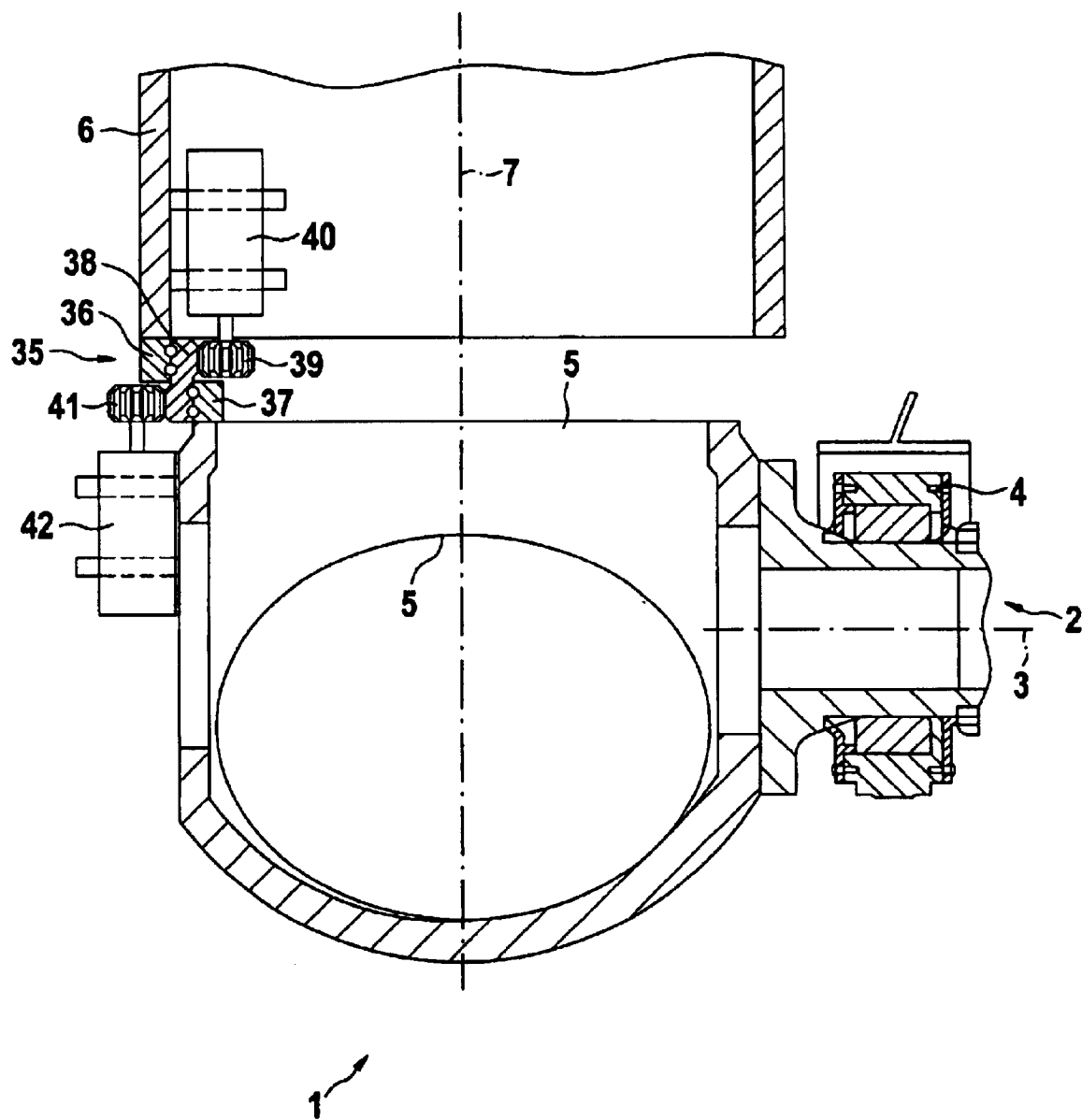
Figure 5:
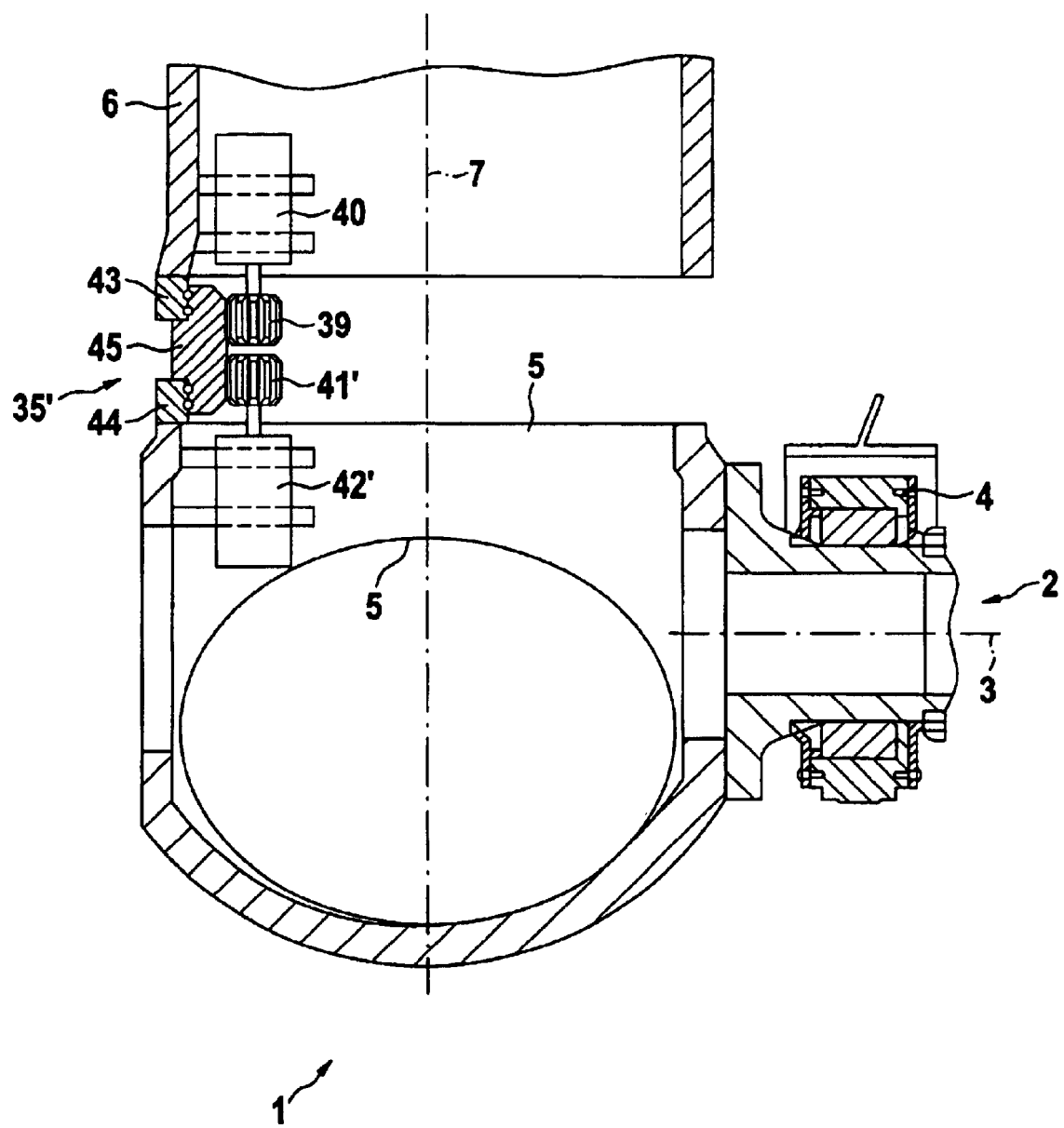

FIG. 2 A diagram to show the azimuthal adjustment rate of a rotor blade as a function of the blade angle FIG. 3 A schematic diagram of an electrical circuit which acts to control the adjustment rate FIG. 4 A sectional view of another embodiment corresponding to FIG. 1 and FIG. 5 The same sectional view of still another embodiment.

FIG. 1 shows a rotor hub 1 on rotor shaft 2, shown only in the region where it connects to the rotor hub 1, in a cross-section through the axis of rotation 3 of the rotor shaft 2. The rotor shaft 2 is supported near its connection to the rotor hub 1 by the rotor main bearing 4 so that it can rotate in a machine housing, not shown, which is supported at the tip of a tower so that it can turn horizontally about the tower axis. Three circular connection openings 5 are shown on the circumference of the housing-like rotor hub 1 at equal azimuthal angular separations of 120° with respect to the axis of rotation 3. Each of them is used to connect a rotor blade 6. FIG. 1 shows only the region of rotor blade 6 near the hub, with its longitudinal axis 7 extending in the plane of the drawing.

Between the rotor hub 1 and each rotor blade 6 there is a means for adjusting the rotor blade 6 about its longitudinal axis 7. With this azimuthal adjustment of the rotor blades 6, the mechanical stress at excessively strong winds can be limited by rotating the rotor blades 6 into a feathered position with respect to the direction of incidence of the wind. According to FIG. 1, this means has a tubular part 8 extending coaxially to the longitudinal axis 7, also called the "Extender". The inner end of the tubular part 8 toward the rotor hub 1 is connected through a flange to the inner ring 9 of a roller bearing 10 which forms a rotatable connection, the outer ring 11 of which is connected through a flange to the connection opening 5 of the rotor hub 1. This is shown only schematically in FIG. 1, but more thoroughly in FIG. 1a. There the axial studs 12 and 13 are clearly apparent. With those studs, the outer ring 11 is fastened to the rotating flange surface of the rotor hub 1, and the inner ring 9 is fastened to the inner flange of the tubular part 8. A bearing housing 14 is also visible between the inner ring 9 and the outer ring 11. With this bearing the two rings can be turned with respect to each other but cannot move axially.

The inner ring 9 has peripheral gearing 15 radially on the inside to mesh with the drive gear of a drive motor fixed to the hub (neither shown). In this way, the tubular part 8 is adjusted azimuthally about its longitudinal axis 7 on actuation of the drive motor. Alternatively, any other type of blade production can be provided instead of a drive motor.

As shown in FIG. 1, the end of the tubular part 8 away from the rotor hub 1 also has a connecting flange 16 at its inner end for the outer ring 17 of a roller bearing 18, which is constructed similarly to the roller bearing 10 (FIG. 1a). The inner end of the rotor blade 6 is flanged to the inner ring 19 of this roller bearing. The inner ring 19 also has internal radial gearing which meshes with the drive gear 20 of a drive motor 21 mounted on the inside of the tubular part 8. When the drive motor is operated, the rotor blade 6 is adjusted azimuthally about its longitudinal axis 7 relative to the tubular part 8. FIG. 1 shows batteries 22 schematically in the inside of the tubular part 8. Those batteries provide the electrical energy to operate the drive motor 21.

This design makes it clear that the adjusting movements of the two rotatable connections at the roller bearings 10 and 18 are superimposed so that the azimuthal adjustment angle of rotor blade 6 is the directed combination of the azimuthal adjustment of the tubular part 8 with respect to the rotor hub 1 and the azimuthal adjustment of the rotor blade 6 with respect to the tubular part 8. It is also apparent that the two adjustment systems producing the superimposed movements are completely independent of each other. To the extent that one of the two adjustment systems might fail, the adjustment can be produced by the other adjustment system. FIG. 2 shows the curve of the azimuthal adjustment rate of the rotor blade as a function of the blade angle for one advantageous operating mode of the two adjustment systems. In this case, one of the two adjustment systems is driven at a constant adjustment rate, while the other adjustment system starts with the same initial adjustment rate at blade angle 0 and is reduced linearly to adjustment rate 0 at the rotor angle 90°. That corresponds to the strictly trapezoidal adjustment rate curve shown by the solid line 23 in FIG. 2. As continuous reduction is relatively expensive, though, the trapezoidal form can be approached in practice by a stepwise curve that can be produced by actuating switches, especially for the case of a safety shutdown. Such a stepwise approximation with four steps is shown by the dashed line 24 in FIG. 2. If one of the two adjustment systems fails, then the adjustment is done at the maximum adjustment rate of the other adjustment system. That is shown by the horizontal dashed line 25 in FIG. 2.

FIG. 3 shows one possible electrical control system for the drive motors M1 and M2 of the two adjustment systems with which the stepwise course 24 shown in FIG. 2 can be produced. The figure shows a battery providing electrical driving energy for the driving current circuit of motor M1, in series with a limit switch 27, which switches off drive motor M1 when a 90° blade angle is attained. It also shows a switching relay 28 which closes the drive current circuit in case of system power failure or of initiation of the safety shutdown. In this way, the drive motor M1 of one adjustment system is constantly supplied with driving energy from the battery 26 on closure of the switching relay 28, so that it drives the adjustment system at a constant adjustment rate. Both the limit switch 27 and the switching relay 28 have a second, simultaneously actuated, switch contact. Both of these second switch contacts are in the control circuit of drive motor M2 of the other adjusting system, so that it is switched on or off simultaneously with the first adjustment system. This control circuit also has a series circuit in which four switches, S0 to S3, alternate with four batteries 29, 30, 31, 32. In the circuit status of switches S0 to S3 shown in FIG. 3, these batteries are connected in series, with the result that the drive motor M2 provides the maximum adjustment rate. The switches in this series, S0, S1, S2 and S3, are switched over to positions opposite to those shown in FIG. 3 by suitably placed cams, as a function of the adjustment path of the adjustment system driven by drive motor M1. That removes each of the batteries involved, 29 to 32, from the control circuit because the control circuit passes only through a conductor 33 instead of through the battery. Each throw of a switch S0 to S3 is, then, equivalent to one step in FIG. 2.

FIG. 3 also shows that the drive motor M1 with constant control is a shunt-wound machine, while drive Motor M2 of the other system controlled by switches S0 to S3 is a series-wound machine. The behavior of the former is such as to keep the adjustment rate largely constant at low loads. The latter also provides the desired high starting torque, even in battery operation. Alternatively, the two-pole stator winding 34 can be reconnected instead of controlling by the switches S0 to S3.

The embodiment shown in FIG. 4 corresponds to that shown in FIG. 1 except that the tubular part 8 between the two rotatable connections 10, 18 in FIG. 1 is omitted in FIG. 4. Otherwise, the same reference numbers are used in FIG. 4 as in FIG. 1 for matching parts.

FIG. 4 differs from FIG. 1 in that there is in FIG. 4 a roller bearing 35 with three rings and two bearing housings between the end of the rotor blade 6 toward the rotor hub 1 or an extender which extends rotor blade 6, and the matching connection opening 5 of the rotor hub 1. The inner end of the rotor blade 6, or of its extender, is flanged to the outer ring 36, while the inner ring 37 is flanged to the connecting opening 5 of rotor hub 1. The middle ring 38, between the outer and inner rings 36, 37, can be moved through the bearing housings at both sides of it in relation to both the other rings 36, 37, but does not move axially. Furthermore, the outer and inner rings 36, 37 are axially displaced from each other. The radial outer and radial inner surfaces of the middle ring 38 opened up by that displacement each have external or internal gearing. The drive gear 39 of a drive motor 40 mounted inside the rotor blade 6 or its extender meshes with the internal gearing, while the drive gear 41 of drive motor 42 mounted on the outside of the rotor hub 1 meshes with the external gearing. In this way, the two independent movements are carried out at the three-ring roller bearing 35.

The embodiment shown in FIG. 5 is equivalent to that of FIG. 4 with the sole difference that the drive motor 42 mounted on the hub, with drive gear 41 now inside the rotor hub 1. That is indicated in FIG. 5 by the reference numbers 41' and 42'. Otherwise, parts matching those in FIG. 4 have the same reference numbers. It must be noted that the three-ring roller bearing 35 of FIG. 4 has a somewhat different form in FIG. 5, as indicated by the reference number 35'.

In detail, roller bearing 35' has the same three rings and two bearing housings as roller bearing 35. However, two radial outer rings 43, 44 are mounted so that they are aligned axially through bearing housings so that they can rotate on an inner ring 45 and do not move axially, with one outer ring 43 flanged to the rotor blade 6 or its extender and the other outer ring 44 is flanged to the connection opening 5 of rotor hub 1. The inner ring 45 has internal gearing which can mesh both with the drive gear 42 of drive motor 42' mounted on the hub and with the drive gear 39 of the drive motor 40 mounted on the rotor blade. As can be seen, this also provides two independent movements of the two adjustment systems at the single roller bearing 35'.

The variants shown represent many variants which can be produced by systematic variation of the spatial arrangement of the elements involved, derived from the laws of design methodology.

In all the embodiments described above, the two adjustment systems can be driven oppositely, so that the resulting adjustment angle is 0; that is, the rotor blade adjustment angle does not change. That can be utilized by moving the two rotatable connections oppositely so as to produce good distribution of the lubricant without necessarily producing any change in the rotor blade adjustment angle. In the same way, the relative movement between the two rotatable connections can be carried out so as to give even distribution, over time, of the loads around the periphery, without necessarily changing the rotor blade adjustment angle.

In a deviation from the embodiments shown, in which the axes of rotation of the two adjustment systems are parallel, the axes of rotation of the two adjustment systems can be at an angle with each other. Then the rotational movements of the two rotatable connections can be controlled with respect to each other so as to set a certain cone angle for the rotor blades concerned with respect to the radial plane of the rotor shaft, without necessarily producing a change in the rotor blade adjustment angle.

What is claimed is:

1. An apparatus, comprising:
   means for adjusting a rotor blade with its longitudinal axis extending out from a rotor hub of a wind power plant through an azimuthal adjustment angle with respect to the longitudinal axis, two independent adjustment systems each of which produces adjustment of the rotor blade even in case of failure of the other adjustment system, wherein each of the two adjustment systems has a rotatable connection between the rotor hub and the rotor blade that is adjustable by a drive and the two rotatable connections are arranged substantially concentric with each other.

2. The apparatus according to claim 1, wherein the two rotatable connections are axially separated from each other.

3. The apparatus according to claim 2 wherein one of the two rotatable connections and its drive are placed at the rotor hub and the other rotatable connection and its drive is placed outside the rotor hub.

4. The apparatus according to claim 3, wherein the rotatable connection placed outside the rotor hub and its drive is placed on a tubular part extending axially between the two rotatable connections.

5. The apparatus according to claim 4, wherein the tubular part is a fiber composite part preferably produced with a winding process.

6. The apparatus according to claim 1, wherein one of the two rotatable connections and its drive is placed on the rotor hub and the other rotatable connection and its drive is placed directly on the rotor blade.

7. The apparatus according to claim 6, wherein the drive of the rotatable connection placed at the rotor blade is placed substantially within the rotor blade.

8. The apparatus according to claim 6, wherein the drive of the rotatable connection on the rotor blade is placed substantially outside the rotor blade.

9. The apparatus according to claim 1, wherein the two adjustment systems can be actuated simultaneously, especially in the case of a safety shutdown.

10. The apparatus according to claim 1, wherein the azimuthal adjustment rate resulting from operation of the two adjustment systems controllable variably, depending on one or more of time, the rotor blade angle, and the distance of adjustment.

11. The apparatus according to claim 1 wherein the adjustment rate of one adjustment system is controlled as a function of the adjustment distance of the other adjustment system.

12. The apparatus according to claims 1, wherein at least one, of the adjustment systems is an electrical system.

13. The apparatus according to claim 12, wherein the adjustment rate is changed by stepwise switching on or off of batteries feeding the motor.

14. The apparatus according to claim 12, wherein the adjustment rate is changed by stepwise reconnection of a stator winding of the drive.

15. The apparatus according to claim 12, wherein the drive of one adjustment system has a series-wound motor (M2) and the drive of the other adjustment system has a shunt-wound motor.

16. The apparatus according to claim 12, wherein the drive of one adjustment system is a three-phase motor and the drive of the other adjustment system is a direct-current motor.

17. The apparatus according to claim 1, further comprising:
   a monitoring system, by which, in case of a failure of one of the two adjustment systems, the adjustment rate of the other adjustment system is adjustable upward.

18. The apparatus according to claim 1, wherein the axes of rotation of the two rotatable connections are at an angle to each other.

19. The apparatus according to claim 1, wherein the two rotatable connections are formed by a single live ring bearing with three rings and two bearing housings.

20. A process for adjusting a rotor blade with its longitudinal axis extending out from a rotor hub of a wind power plant through an azimuthal adjustment angle with respect to the longitudinal axis, using a drive having two independent adjustment systems, each of which comprises an adjustable rotatable connection between the rotor blade and the rotor hub, characterized in that the two rotatable connections are driven relative to each other during the setting of a specified adjustment angle in a manner which favors even distribution of lubricant in the rotatable connections and are driven relative to each other in opposite directions when maintaining a constant adjustment angle of the rotor blade.

21. An apparatus, comprising:
   a first electric motor driven adjustment system having a first drive actuator to adjust a rotor blade with its longitudinal axis extending out from a rotor hub of a wind power plant through an azimuthal adjustment angle with respect to the longitudinal axis;
   a second adjustment system having a second drive actuator to adjust the rotor blade through the azimuthal adjustment angle, the two adjustment systems being independent and each producing adjustment of the rotor blade even in case of failure of the other adjustment system, and wherein the first drive actuator and the second drive actuator are driven relative to each other in opposite directions when maintaining a constant adjustment angle of the rotor blade.

22. An apparatus, comprising:
   means for adjusting a rotor blade with its longitudinal axis extending out from a rotor hub of a wind power plant through an azimuthal adjustment angle with respect to the longitudinal axis characterized in that the means has two independent adjustment systems each of which produces adjustment of the rotor blade even in case of failure of the other adjustment system, wherein the two adjustment systems each have a rotatable connection between the rotor hub and the rotor blade which can be adjusted by a drive and that one of the two rotatable connections and its drive are placed at the rotor hub and the other rotatable connection and its drive is placed outside the rotor hub.

23. An apparatus, comprising:

means for adjusting a rotor blade with its longitudinal axis extending out from a rotor hub of a wind power plant through an azimuthal adjustment angle with respect to a the longitudinal axis characterized in that the means has two independent adjustment systems each of which produces adjustment of the rotor blade even in case of failure of the other adjustment system, wherein each of the two adjustment systems has a rotatable connection between the rotor hub and the rotor blade which can be adjusted by a drive and that one of the two rotatable connections and its drive are placed at the rotor hub and the two rotatable connections are axially separated from each other.

* * * * *